US009823096B2

(12) United States Patent
Sakata

(10) Patent No.: US 9,823,096 B2
(45) Date of Patent: Nov. 21, 2017

(54) REFLECTIVE TYPE OPTICAL ENCODER

(71) Applicant: FANUC CORPORATION, Minamitsuru-gun, Yamanashi (JP)

(72) Inventor: Akinobu Sakata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 221 days.

(21) Appl. No.: 14/730,792

(22) Filed: Jun. 4, 2015

(65) Prior Publication Data

US 2015/0354993 A1    Dec. 10, 2015

(30) Foreign Application Priority Data

Jun. 9, 2014    (JP) .................. 2014-118890

(51) Int. Cl.
*G01D 5/34*    (2006.01)
*G01D 5/347*    (2006.01)

(52) U.S. Cl.
CPC ....... *G01D 5/3473* (2013.01); *G01D 5/34715* (2013.01)

(58) Field of Classification Search
USPC .......................................... 250/231.1–231.19
See application file for complete search history.

(56) References Cited

U.S. PATENT DOCUMENTS

2007/0114283 A1    5/2007   Foo
2007/0246646 A1*  10/2007   Lum .................. G01D 5/34715
                                              250/231.13
2008/0282566 A1   11/2008   Holzapfel
2013/0001411 A1*   1/2013   Tojo .................... G01D 5/34723
                                              250/227.11
2014/0268658 A1*   9/2014   Axtell .................... G02B 5/021
                                              362/97.2

FOREIGN PATENT DOCUMENTS

| JP | 62082324 A | 4/1987 |
|---|---|---|
| JP | 08233608 A | 9/1996 |
| JP | H11-287671 A | 10/1999 |
| JP | 2000227346 A | 8/2000 |
| JP | 2002267497 A | 9/2002 |
| JP | 2002323347 A | 11/2002 |
| JP | 2004-325231 | 11/2004 |
| JP | 2006030006 A | 2/2006 |
| JP | 2009002932 A | 1/2009 |
| JP | 2011179938 A | 9/2011 |
| JP | 2012202952 A | 10/2012 |
| WO | 2011114938 A1 | 9/2011 |

\* cited by examiner

*Primary Examiner* — Thanh Luu
(74) *Attorney, Agent, or Firm* — RatnerPrestia

(57) ABSTRACT

A code plate of an optical encoder has a nonplanar incident part on a first major surface for transmitting light emitted from a light emitter to the inside of the code plate, and a planar primary reflection part for fully reflecting the transmitted light. The first major surface is also provided with a code pattern part which extends in a ring shape around the rotation axis at a position different from the incident part to switch transmission/non-transmission of the totally reflected light in accordance with a rotation position of the code plate. The code pattern part has nonplanar exit parts which transmit the totally reflected light, and planar secondary reflection parts which again totally reflect the totally reflected light. The secondary reflection parts and exit parts are alternately arranged in the circumferential direction about the rotation axis.

6 Claims, 7 Drawing Sheets

REFLECTIVE TYPE OPTICAL ENCODER

BACKGROUND OF THE INVENTION

1. Field of the Invention

The present invention relates to an optical encoder which detects a rotation position of a rotatable member based on the reflected light which is obtained by emitting light toward a rotary type code plate.

2. Description of the Related Art

In the field of industrial machinery, various encoders are used as sensors for detecting the positions of electric motors or equipment which are driven by electric motors. In particular, optical encoders are broadly employed for the purpose of detecting the rotation positions of drive shafts of rotary motors. In general, optical encoders may be classified into transmissive types which detect rotation positions of rotatable members based on transmitted light which is obtained by emitting light toward rotary type code plates, or reflective types which detect rotation positions of rotatable members based on reflected light which is obtained by emitting light toward rotary type code plates. A transmissive type encoder has a structure in which with the light emitting diode and the light receiving diode are arranged along the rotation axe so as to interpose the code plate. On the other hand, a reflective type encoder has a structure in which the light emitting diodes and the light receiving diodes face the same major surface of the code plate. Therefore, a reflective type encoder has the advantage of being easily downsized in the direction of the rotation axis, compared with a transmissive type encoder.

In relation to this, JP-A-H11-287671 proposes a reflective type encoder which is provided with a code plate formed from a transparent plastic material, while JP-B-3730232 proposes a reflective type encoder which is provided with code plate which is formed from a polyether imide, polyether sulfone, polyphenyl sulfone, or other colored plastic material. If these plastic materials are used for a code plate, it is possible to easily and inexpensively manufacture a code plate with complex code patterns by means of injection molding or other plastic forming techniques.

More specifically, the code plate described in JP-A-H11-287671 is provided with a code pattern which is comprised of V-shaped groove parts and planar parts which are formed on a second major surface on the opposite side to the first major surface which faces the light emitting diode, and is configured to switch transmission/reflection of light by means of these groove parts and planar parts. In order to ensure the total reflection by the planar parts of the second major surface, the incident angle of the light with respect to the planar parts has to be equal to or more than a predetermined critical angle, but due to refraction at the first major surface, the incident angle of the light with respect to the flat parts becomes smaller than the incident angle of the light with respect to the first major surface. Therefore, if the code plate described in JP-A-H11-287671 is employed, the incident angle of the light with respect to the first major surface has to be sufficiently large, and this may cause a reduction in the degree of freedom of arrangement of light emitting diodes with respect to the code plate.

Further, the code plate described in JP-B-3730232 is provided with a code pattern comprised of projecting parts with triangular cross-sections and planar parts which are formed on a second major surface on the opposite side to the first major surface facing the light emitting diode, and is configured to switch total reflection/transmission of light by means of the projecting parts and planar parts. In the code plate described in JP-B-3730232, the projecting parts on the second major surface are configured to reflect the light vertically entering the first major surface perpendicularly to the first major surface. However, if the light receiving diode is arranged on the route of such reflected light, there is a risk that part of the light heading from the light emitting diode toward the first major surface is blocked by the light receiving diode.

A reflective type optical encoder which can improve a degree of freedom of arrangement of a light emitting diode with respect to a code plate is therefore being sought.

SUMMARY OF INVENTION

According to a first aspect of the present invention, there is provided an optical encoder comprising a rotary type code plate which has a first major surface and a second major surface which faces the opposite side of the first major surface, a light emitter which emits light toward the first major surface, and a light receiver which receives the light reflected by the code plate, wherein the first major surface is provided with a nonplanar incident part which extends in a ring shape around a rotation axis of the code plate and transmits the light emitted from the light emitter to the inside of the code plate, the second major surface is provided with a planar primary reflection part which totally reflects the light which advances through the inside of code plate, the first major surface is further provided with a code pattern part which extends in a ring shape around a rotation axis of the code plate at a different position from the incident part and which switches transmission/non-transmission of the totally reflected light by the primary reflection part in accordance with a rotation position of the code plate, and the code pattern part has nonplanar exit parts which transmit the totally reflected light by the primary reflection part toward the light receiver, and planar secondary reflection parts which again totally reflect the totally reflected light by the primary reflection part, the secondary reflection parts and the exit parts being arranged alternately in a circumferential direction around the rotation axis of the code plate.

According to a second aspect of the present invention, there is provided an optical encoder in the first aspect, wherein the incident part has the form of one or more annular projections which are formed on the first major surface.

According to a third aspect of the present invention, there is provided an optical encoder in the second aspect, wherein the annular projection has a triangular cross-section in a plane containing the rotation axis.

According to a fourth aspect of the present invention, there is provided an optical encoder in the second aspect, wherein a cross-section of the annular projection in a plane containing the rotation axis includes a convex curved contour which sticks out from the first major surface.

According to a fifth aspect of the present invention, there is provided an optical encoder in the first aspect, wherein the incident part has the form of one or more annular grooves which are formed on the first major surface, and the annular groove has a triangular cross-section in a plane containing the rotation axis.

According to a sixth aspect of the present invention, there is provided an optical encoder in any one of the first to fifth aspects, wherein the code plate is formed from a plastic material.

These and other objects, features, and advantages of the present invention will become clearer with reference to the detailed description of illustrative embodiments of the present invention which are shown in the attached drawings.

DETAILED DESCRIPTION OF EMBODIMENTS

Figure 1:
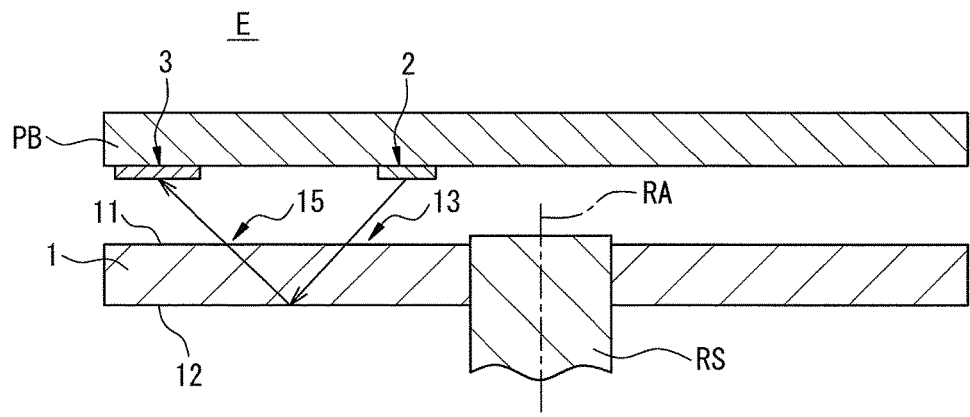
FIG. 1 is a cross-sectional view of an optical encoder of one embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 13, an optical encoder of one embodiment of the present invention will be explained. The optical encoder of the present embodiment is an optical sensor which detects a rotation position of a drive shaft of a rotary motor or a rotary shaft which is coupled with a rotatable member. In particular, the optical encoder of the present embodiment is a reflective type optical encoder in which a light emitting diode and a light receiving diode are arranged so as to face the same major surface of a code plate. FIG. 1 is a cross-sectional view along a plane containing a rotation axis RA of a typical optical encoder E of the present embodiment.

As shown in FIG. 1, the optical encoder E of the present example comprises a drive shaft of a rotary motor or a columnar rotary shaft RS which is coupled with a rotatable member (not shown) which is driven by a rotary motor, a disk-shaped code plate 1 which is coupled to a front end part of the rotary shaft RS, a light emitter 2 which emits light toward the code plate 1, and a light receiver 3 which receives the reflected light by the code plate 1. More specifically, the code plate 1 of the present example has a first major surface 11 which faces the same direction as the front end face of the rotary shaft RS, and a second major surface 12 which faces a direction opposite to the first major surface 11. The code plate 1 rotates together with the rotary shaft RS about a rotation axis RA. In the following description, the direction of extension of the rotation axis RA may be referred to as the "axial direction" and the direction vertical to the rotation axis RA may be referred to as the "radial direction". The code plate 1 of the present example can be formed from various plastic materials. Further, the optical encoder E of the present example is provided with a flat-plate shaped printed board which is spaced by a predetermined distance from the first major surface 11. The light emitter 2 and light receiver 3 of the present example are attached to the flat surface of the printed board PB which faces the first major surface 11. Further, the light emitter 2 of the present example is provided with a red LED (light emitting diode) or infrared LED or other light emitting diode, while the light receiver 3 of the present example is provided with photodiodes or phototransistors or other light receiving diodes. These light emitting diode and light receiving diodes are connected to a circuit network of the printed board PB.

Here, the principle by which the optical encoder E detects the rotation position of the rotary shaft RS will be explained. First, if the light emitter 2 of the optical encoder E emits light of a predetermined incident angle toward the first major surface 11 of the code plate 1, the code plate 1 of the optical encoder E totally reflects the light which enters the first major surface 11 at the second major surface 12. As shown in FIG. 1, the first major surface 11 is provided with a code pattern part 15 which extends in a ring shape around the rotation axis RA. This code pattern part 15 is designed to switch transmission/non-transmission of the light which was totally reflected by the second major surface 12, in accordance with the rotation position of the code plate. That is, the code pattern part 15 converts the totally reflected light by the second major surface 12 to a light and dark pattern corresponding to the rotation position of the code plate 1. Further, the light receiver 3 of the optical encoder E converts the light and dark pattern which was output from the code pattern part 15 to an electrical signal, and outputs the electrical signal. The thus output electrical signal is used as the basis to detect the rotation position of the rotary shaft RS which is coupled with the code plate 1.

Figure 2:
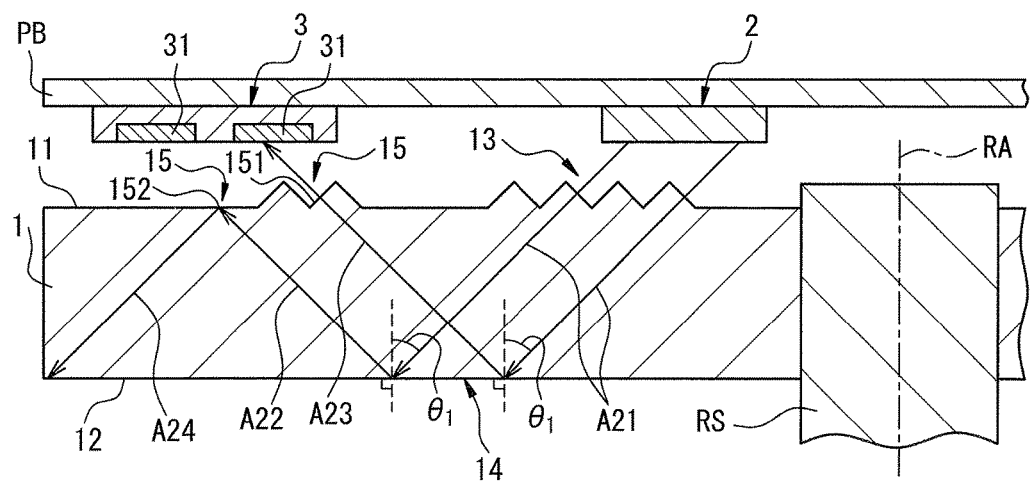
FIG. 2 is a first enlarged view which shows a code pattern part and its vicinity in a code plate in FIG. 1.

Next, the detailed structure of the code plate 1 of the present example will be explained. FIG. 2 is an enlarged view which shows part of the optical encoder E of FIG. 1. As shown in FIG. 2, the light receiver 3 of the present example is provided with a plurality of light receiving diodes 31, 31 which are arranged in the radial direction, and is configured to output a multiphase waveform based on the light and dark pattern received by the plurality of light receiving diodes 31, 31. In particular, the light receiver 3 of the present example is provided with a pair of light receiving diodes 31, 31 which are arranged in the radial direction, and is configured to output a biphase waveform based on the light and dark pattern received by the pair of the light receiving diodes 31, 31. Below, the light receiving diode 31 at the outer position in the radial direction may be referred to as the "A-phase light receiving diode 31", while the light receiving diode 31 at the inner position in the radial direction may be referred to as the "B-phase light receiving diode 31". Similarly, the waveform which is output from the A-phase light receiving diode 31 may be the "A-phase waveform", while the waveform which is output from the B-phase light receiving diode 31 may be referred to as the "B-phase waveform".

As shown in FIG. 2, the first major surface 11 of the code plate 1 of the present example is provided with an incident part 13 which extends in a ring shape about the rotation axis RA. Further, the incident part 13 of the present example has a nonplanar boundary surface which transmits the light which is emitted from the light emitter 2 to the inside of the code plate 1. In particular, the incident part 13 of the present example has a concave-convex boundary surface which is formed on the first major surface 11. More specifically, the incident part 13 of the present example has the form of a plurality of annular projections which are arranged in the radial direction. Each of these annular projections has a triangular cross-section in a plane containing the rotation axis RA. As shown in FIG. 2, the light which is emitted from the light emitter 2 reaches the boundary surface of the incident part 13 at a generally zero incident angle, and therefore the light which is transmitted to the inside of the code plate 1 heads toward the second major surface 12 almost without being refracted. The path of the light which is transmitted to the inside of the code plate 1 through the incident part 13 and heads toward the second major surface 12 is shown by the arrows A21 in the figure. Note that in the optical encoder E of the present embodiment, the form of the incident part 13 of the code plate 1 is not limited to only the example illustrated in FIG. 2. The incident part 13 of the code plate 1 may have any other nonplanar form for transmitting the light which is emitted from the light emitter 2. Modifications of the incident part 13 of the code plate 1 will be explained further later (see FIG. 9 to FIG. 13).

Further, the second major surface 12 of the code plate 1 of the present example is provided with a primary reflection part 14 which extends in a ring shape around the rotation axis RA. As shown in FIG. 2, the primary reflection part 14 of the present example has a planar boundary surface which totally reflects the light which was transmitted to the inside of the code plate 1. Here, the incident angle $\theta_1$ of the light which reaches the primary reflection part 14 is equal to or more than the critical angle $\theta_c$ which is determined by the refractive index $n_1$ of the plastic material comprising the code plate 1 and the refractive index $n_1$ of the air. That is, in the present example, the direction of the light which is emitted from the light emitter 2 is determined so that the relationship of $\theta_1 \geq \theta_c$ is satisfied. Note that, the critical angle $\theta_c$ is calculated from the following formula (1):

$$\theta_c = \arcsin(n_2/n_1) \qquad (1)$$

Further, the first major surface 11 of the code plate 1 of the present example is further provided with a plurality of code pattern parts 15, 15 which extend in ring shapes around the rotation axis RA. In particular, the first major surface 11 of the code plate 1 of the present example is further provided with a pair of code pattern parts 15, 15. As shown in FIG. 2, the pair of code pattern parts 15, 15 are provided at different positions from the incident part 13 in the radial direction. More specifically, both of the pair of code pattern parts 15, 15 are located outside the incident part 13 in the radial direction. However, the pair of code pattern parts 15, 15 may also be located inside the incident part 13 in the radial direction. In the example of FIG. 2, the pair of code pattern parts 15, 15 are arranged in the radial direction. The code pattern part 15 at the outer position in the radial direction is configured to switch transmission/non-transmission of the light which is totally reflected by the primary reflection part 14 and heads toward the A-phase light receiving diode 31, in accordance with the rotation position of the code plate 1. For this reason, in the example of FIG. 2, the code pattern part 15 which is positioned at the outer position in the radial direction may be referred to below as the "A-phase code pattern part 15". The path of the light which is totally reflected by the primary reflection part 14 and heads toward the A-phase code pattern part 15 is shown by the arrow A22 in the figure. Similarly, in the example of FIG. 2, the code pattern part 15 at the inner position in the radial direction is configured to switch transmission/non-transmission of the light which is totally reflected at the primary reflection part 14 and heads toward the B-phase light receiving diode 31, in accordance with the rotation position of the code plate 1. For this reason, in the example of FIG. 2, the code pattern part 15 at the inner position in the radial direction may be referred to below as the "B-phase code pattern part 15". The path of the light which is totally reflected by the primary reflection part 14 and heads toward the B-phase code pattern part 15 is shown by the arrow A23 in FIG. 2.

Figure 3:
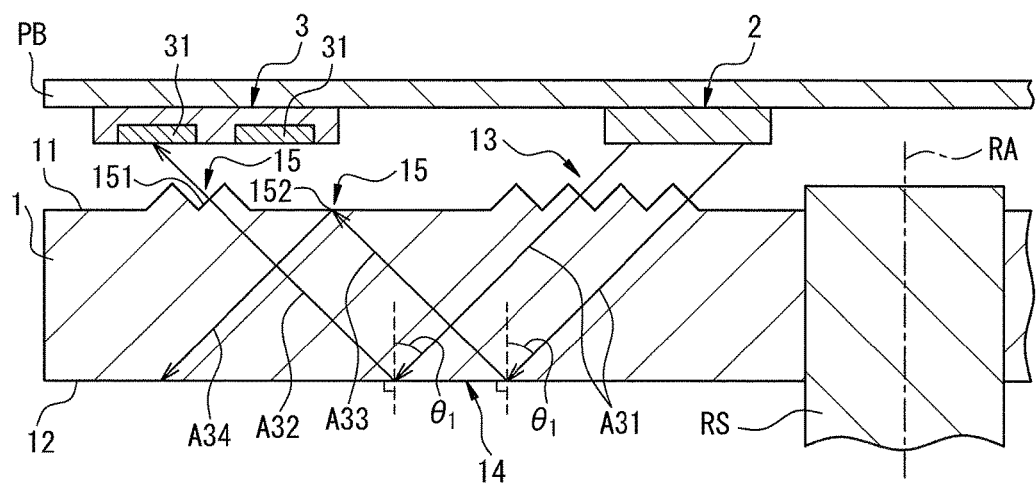
FIG. 3 is a second enlarged view which shows a code pattern part and its vicinity in a code plate in FIG. 1.

FIG. 3 is an enlarged view similar to FIG. 2 and shows the state after the code plate 1 in FIG. 2 has been rotated by a predetermined angle. In FIG. 3, the path of the light which is transmitted to the inside of the code plate 1 through the first major surface 11 and heads toward the second major surface 12 is shown by the arrow A31. Similarly, the path of the light which is totally reflected by the primary reflection part 14 and heads toward the A-phase code pattern part 15 is shown by the arrow A32 in FIG. 3. The path of the light which is totally reflected at the primary reflection part 14 and heads toward the B-phase code pattern part 15 is shown by the arrow A33 in FIG. 3. As will be understood from FIG. 2 and FIG. 3, the A-phase code pattern part 15 is comprised of nonplanar exit parts 151 which transmits the light which was totally reflected by the primary reflection part 14 toward the A-phase light receiver 3, and planar secondary reflection parts 152 which again totally reflect the light which was totally reflected by the primary reflection part 14. The path of the light which is totally reflected by the secondary reflection parts 152 of the A-phase code pattern part 15 is shown by the arrow A34 in FIG. 3. Further, the exit parts 151 and the secondary reflection parts 152 of the A-phase code pattern part 15 are alternately arranged in the circumferential direction about the rotation axis RA. This ensures that transmission/non-transmission of light toward the A-phase light receiving diode 31 is switched according to the rotation position of the code plate 1.

As will be understood from FIG. 2 and FIG. 3, the B-phase code pattern part. 15, in the same way as the A-phase code pattern part 15, is comprised of nonplanar exit parts 151 which transmit the light which was totally reflected by the primary reflection part 14 toward the B-phase light receiver 3, and planar secondary reflection parts 152 which again totally reflect the light which was totally reflected at the primary reflection part 14. The path of the light which is totally reflected by the secondary reflection part 152 of the B-phase code pattern part 15 is shown by the arrow A24 in FIG. 2. Further, the exit parts 151 and secondary reflection parts 152 of the B-phase code pattern part 15 are alternately arranged in the circumferential direction around the rotation axis RA. As will be understood from FIG. 2 and FIG. 3, the positions of the exit parts 151 and the secondary reflection parts 152 of the A-phase code pattern part 15 are offset from the positions of the exit parts 151 and the secondary reflection parts 152 of the B-phase code pattern part 15 by a predetermined angular distance about the rotation axis RA. The optical encoder E of the present example can therefore detect the rotation direction of the rotary shaft RS based on the positional relationship of the A-phase waveform and the B-phase waveform.

Next, referring to FIG. 2 and FIG. 3, each exit part 151 has a concave-convex boundary surface which is formed on the first major surface 11. More specifically, each exit part 151 has the form of a plurality of projections which are arranged in the radial direction. Each of these projections has a triangular cross-section in the plane containing the rotation axis RA. The incident angle of the light which reaches the boundary surface of an exit part 151 is generally zero, and therefore the light which is emitted from the exit part 151 heads toward the A-phase or the B-phase light receiving diode 31 almost without being refracted. By employing a plurality of projections with such triangular cross-sections as an exit part 151, it is possible to downsize the exit part 151 in the axial direction, and thus possible to downsize the entire optical encoder E in the axial direction. Note that, in the optical encoder E of the present embodiment, the form of an exit part 151 of the code plate 1 is not limited to only the example illustrated in FIG. 2 and FIG. 3. An exit part 151 of the code plate 1 may have any nonplanar form which can transmit the light which is totally reflected by the primary reflection part 14. Modifications of the exit parts 151 of the code plate 1 will be explained with reference to FIG. 4 to FIG. 8.

Figure 4:
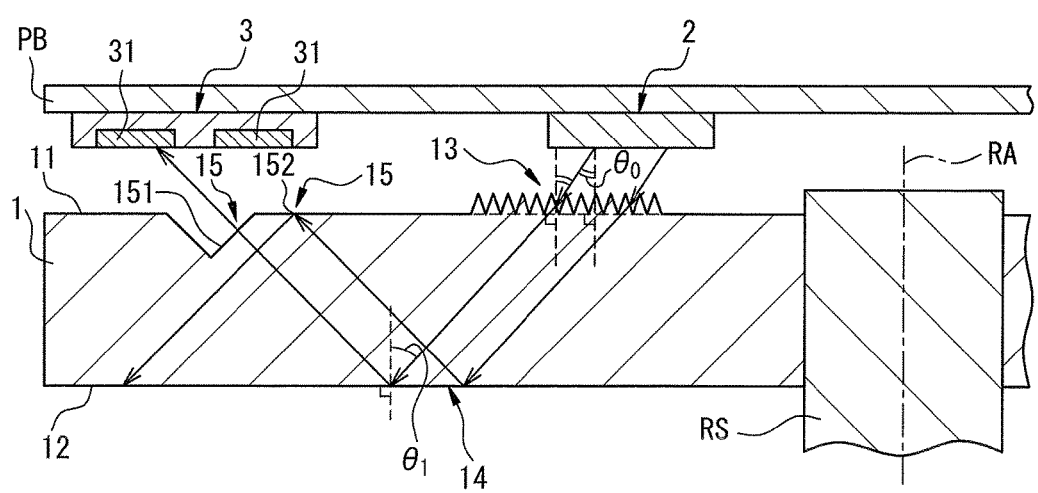
FIG. 4 is an enlarged view similar to FIG. 2 which shows a first modification of an exit part in a code plate of the optical encoder of the present embodiment.

FIG. 4 is an enlarged view similar to FIG. 2 which shows a first modification of an exit part 151 in the code plate 1 of the optical encoder E of the present embodiment. As shown in FIG. 4, each of the exit parts 151 of the present example has the form of a single recessed groove which is formed on the first major surface 11 of the code plate 1. This single recessed groove has a triangular cross-section in the plane containing the rotation axis RA. As shown in FIG. 4, the light which is totally reflected by the primary reflection part 14 reaches the boundary surface of the exit part 151 at a generally zero incident angle, and therefore the light which is emitted from the exit part 151 heads toward the light receiving diode 31 almost without being refracted. According to the present example, the structure of the exit parts 151 is simplified, and therefore it is possible to facilitate manufacture of the entire code plate 1.

Note that the incident part 13 of the code plate 1 of FIG. 4 has the form of a plurality of annular projections which are arranged in the radial direction in the same way as the incident part 13 of the code plate 1 of FIG. 2 and FIG. 3. Each of these annular projections has a triangular cross-section in the plane containing the rotation axis RA. However, in the present example, the light which is emitted from the light emitter 2 enters the boundary surface of the incident part 13 obliquely, and therefore the light which is transmitted to the inside of the code plate 1 heads toward the second major surface 12 after being refracted by the incident part 13. As shown in FIG. 4, due to refraction at the incident part 13, the incident angle $\theta_1$ of the light with respect to the second major surface 12 is larger than the inclination angle $\theta_0$ of the light with respect to the normal line to the first major surface 11 (that is, $\theta_1 > \theta_0$). Therefore, even if the above inclination angle $\theta_0$ is relatively small, it is possible to ensure that the incident angle $\theta_1$ with respect to the second major surface 12 is equal to or more than the critical angle $\theta_c$. By suitably setting the vertex angle of the triangular cross-section of the annular projection in this way, even if the inclination angle $\theta_0$ is relatively small, it is possible to ensure that the light which is transmitted to the inside of the code plate 1 is totally reflected by the second major surface 12. The same is true in the examples of FIG. 5 to FIG. 8 explained later.

Figure 5:
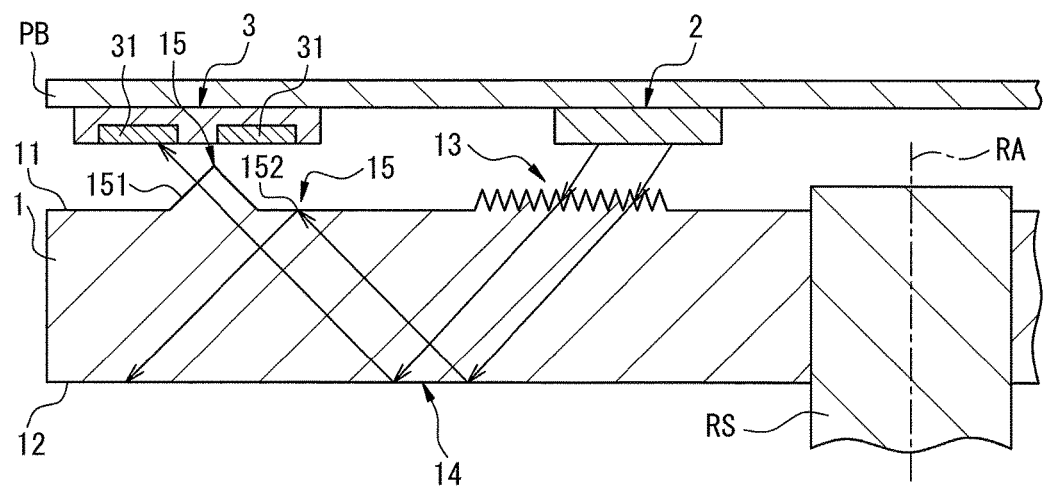
FIG. 5 is an enlarged view similar to FIG. 2 which shows a second modification of an exit part in a code plate of the optical encoder of the present embodiment.

FIG. 5 is an enlarged view similar to FIG. 2 which shows a second modification of an exit part 151 in the code plate 1 of the optical encoder E of the present embodiment. As shown in FIG. 5, each of the exit parts 151 of the present example has the form of a single projection which is formed on the first major surface 11. This single projection has a triangular cross-section in the plane containing the rotation axis RA. As shown in FIG. 5, the light which is totally reflected by the primary reflection part 14 reaches the boundary surface of the exit part 151 at a generally zero incident angle, and therefore the light which is emitted from the exit part 151 heads toward the light receiving diode 31 almost without being refracted. According to the present example, the structure of the exit parts 151 is simplified, and therefore it is possible to facilitate manufacture of the entire code plate 1.

Figure 6:
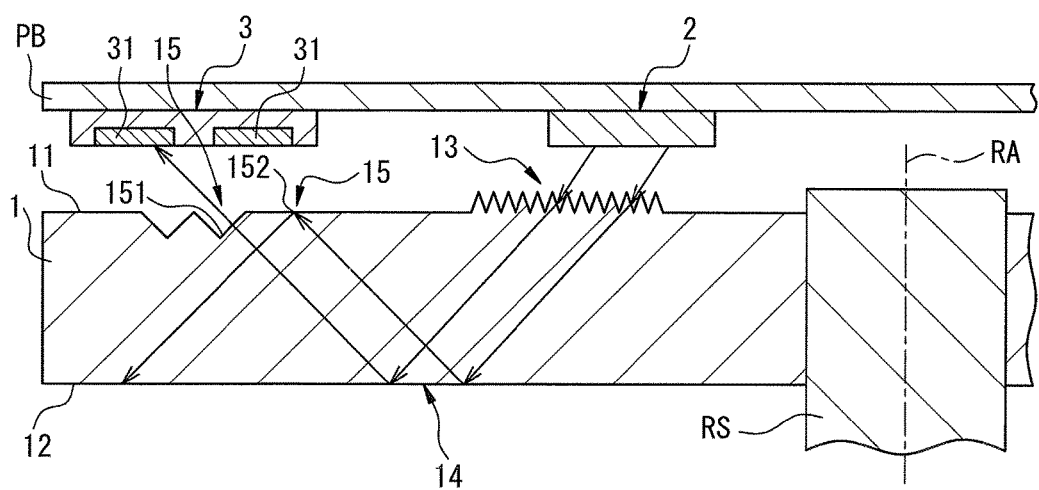
FIG. 6 is an enlarged view similar to FIG. 2 which shows a third modification of an exit part in a code plate of the optical encoder of the present embodiment.

FIG. 6 is an enlarged view similar to FIG. 2 which shows a third modification of an exit part 151 in the code plate 1 of the optical encoder E of the present embodiment. As shown in FIG. 6, each of the exit parts 151 of the present example has the form of a plurality of recessed grooves which are arranged in the radial direction. Each of these recessed grooves has a triangular cross-section in the plane containing the rotation axis RA. As shown in FIG. 6, the light which was totally reflected by the primary reflection part 14 reaches the boundary surface of the exit part 151 at a generally zero incident angle, and therefore the light which is emitted from the exit part 151 heads toward the light receiving diode 31 almost without being refracted. Further, according to the present example, the structure of the exit parts 151 is simplified, and therefore it is possible to facilitate manufacture of the entire code plate 1. Furthermore, according to the present example, the code pattern part 15 can be downsized in the axial direction, and therefore the entire optical encoder E can be downsized in the axial direction can be made small.

Figure 7:
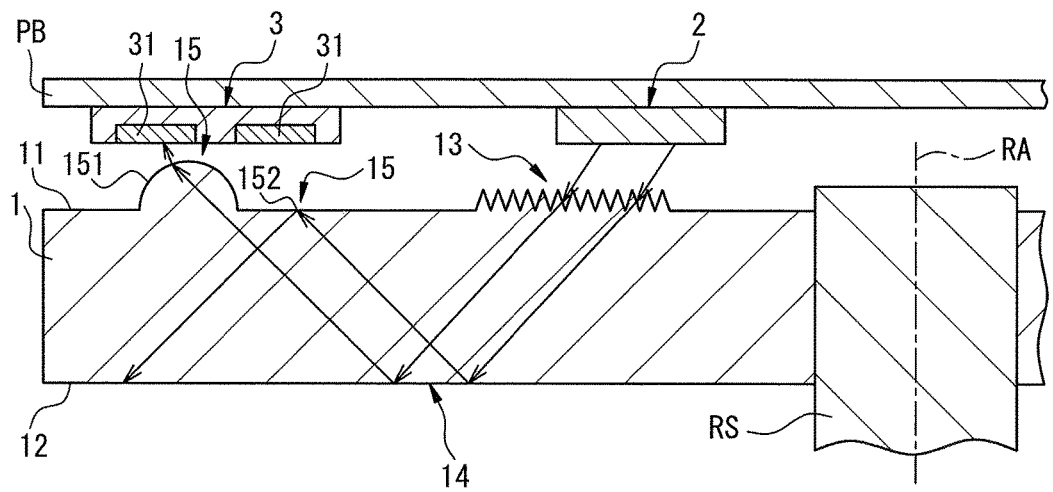
FIG. 7 is an enlarged view similar to FIG. 2 which shows a fourth modification of an exit part in a code plate of the optical encoder of the present embodiment.

FIG. 7 is an enlarged view similar to FIG. 2 which shows a fourth modification of an exit part 151 in the code plate 1 of the optical encoder E of the present embodiment. As shown in FIG. 7, each of the exit parts 151 of the present example has the form of a single projection which is formed on the first major surface 11. Further, the cross-section of this single projection in the plane containing the rotation axis RA includes a convex curved contour which sticks out from a first major surface 11. The exit part 151 with such a form can serve as a plano-convex lens which refracts the light which is totally reflected by the primary reflection part 14. Therefore, according to the exit part 151 of the present example, it is possible to adjust the direction of the light which is emitted from the code plate 1 in accordance with the convex curved contour, and therefore it is possible to improve the degree of freedom of arrangement of the light receiver 3 with respect to the code plate 1. Furthermore, according to the present example, the structure of the exit parts 151 is simplified, and therefore it is possible to facilitate manufacture of the entire code plate 1.

Figure 8:
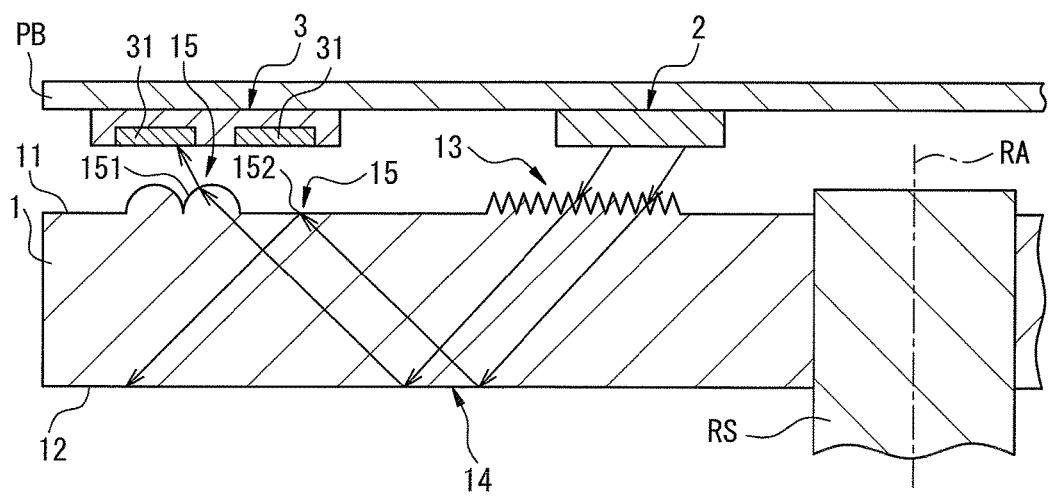
FIG. 8 is an enlarged view similar to FIG. 2 which shows a fifth modification of an exit part in a code plate of the optical encoder of the present embodiment.

FIG. 8 is an enlarged view similar to FIG. 2 which shows a fifth modification of an exit part 151 in the code plate 1 of the optical encoder E of the present embodiment. As shown in FIG. 8, each of the exit parts 151 of the present example has the form of a plurality of projections which are arranged in the radial direction. Further, the cross-section of each of the projections in the plane containing the rotation axis RA includes a convex curved contour which sticks out from the first major surface 11. The exit part 151 with such a form can serve as a plano-convex lens which refracts the light which was totally reflected by the primary reflection part 14. Therefore, according to the exit part 151 of the present example, the direction of the light which is emitted from the code plate 1 can be adjusted in accordance with the convex curved contour, and therefore it is possible to improve the degree of freedom of arrangement of the light receiver 3 with respect to the code plate 1. Further, according to the present example, the structure of the exit parts 151 is simplified, and therefore it is possible to facilitate manufacture of the entire code plate 1. Furthermore, according to the present example, the code pattern part 15 can be downsized in the axial direction, and therefore the entire optical encoder E is downsized in the axial direction.

Figure 9:
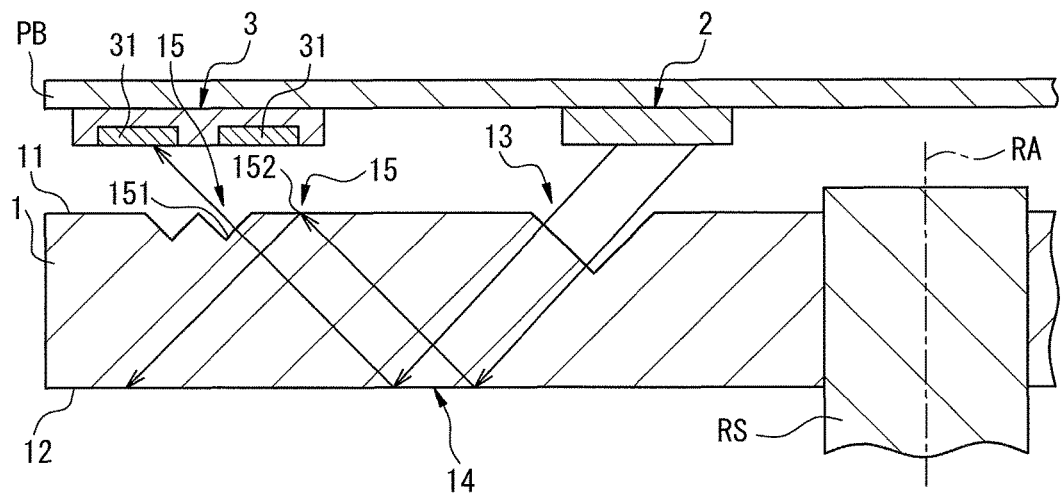
FIG. 9 is an enlarged view similar to FIG. 2 which shows a first modification of an incident part in a code plate of the optical encoder of the present embodiment.

Next, referring to FIG. 9 to FIG. 14, modifications of the incident part 13 of the code plate 1 in the optical encoder E of the present embodiment will be explained. FIG. 9 is an enlarged view similar to FIG. 2 which shows a first modification of the incident part 13 in the code plate 1 of the optical encoder E of the present embodiment. As shown in FIG. 9, the incident part 13 of the present example has the form of a single recessed groove which is formed on the first major surface 11 of the code plate 1. This single recessed groove has a triangular cross-section in the plane containing the rotation axis RA. As shown in FIG. 9, the light which is emitted from the light emitter 2 reaches the incident part 13 at a generally zero incident angle, and therefore the light which is transmitted to the inside of the code plate 1 heads toward the primary reflection part 14 of the second major surface 12 almost without being refracted. According to the present example, the structure of the incident part 13 is simplified, and therefore it is possible to facilitate manufacture of the entire code plate 1.

Figure 10:
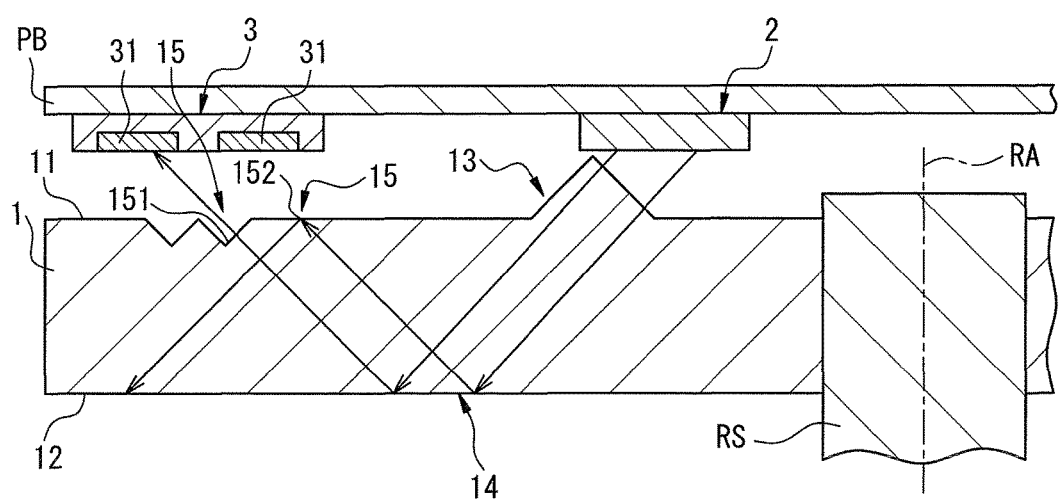
FIG. 10 is an enlarged view similar to FIG. 2 which shows a second modification of an incident part in a code plate of the optical encoder of the present embodiment.

FIG. 10 is an enlarged view similar to FIG. 2 which shows a second modification of the incident part 13 in the code plate 1 of the optical encoder E of the present embodiment. As shown in FIG. 10, the incident part 13 of the present example has the form of a single projection which is formed on the first major surface 11. This single projection has a triangular cross-section in the plane containing the rotation axis RA. As shown in FIG. 10, the light which is emitted from the light emitter 2 reaches the boundary surface of the incident part 13 at a generally zero incident angle, and therefore the light which is transmitted to the inside of the code plate 1 heads toward the primary reflection part 14 of the second major surface 12 almost without being refracted. According to the present example, the structure of the incident part 13 is simplified, and therefore it is possible to facilitate manufacture of the entire code plate 1.

Figure 11:
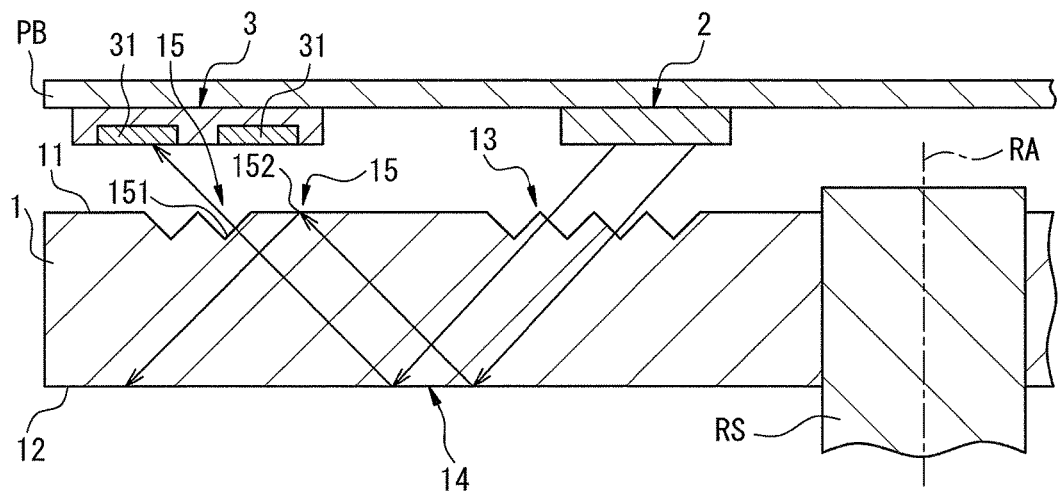
FIG. 11 is an enlarged view similar to FIG. 2 which shows a third modification of an incident part in a code plate of the optical encoder of the present embodiment.

FIG. 11 is an enlarged view similar to FIG. 2 which shows a third modification of the incident part 13 in the code plate 1 of the optical encoder E of the present embodiment. As shown in FIG. 11, the incident part 13 of the present example has the form of a plurality of annular grooves which are arranged in the radial direction. Each of these annular grooves has a triangular cross-section in the plane containing the rotation axis RA. As shown in FIG. 11, light which is emitted from the light emitter 2 reaches the boundary surface of the incident part 13 at a generally zero incident angle, and therefore the light which is transmitted to the inside of the code plate 1 heads toward the primary reflection part 14 of the second major surface 12 almost without being refracted. According to the present example, the structure of the incident part 13 is simplified, and therefore it is possible to facilitate manufacture of the entire code plate 1. Furthermore, according to the present example, the code pattern part 15 can be downsized in the axial direction, and therefore the entire optical encoder E can be downsized in the axial direction.

Figure 12:
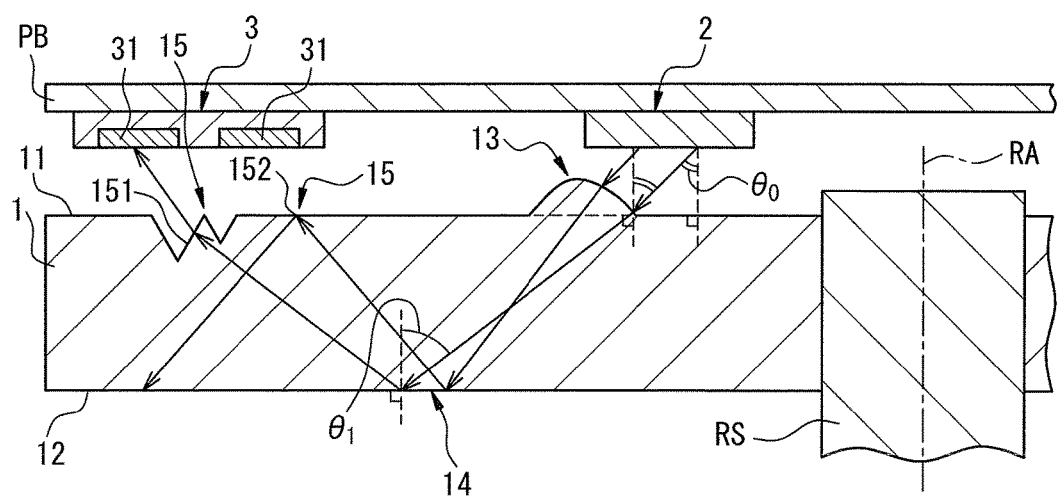
FIG. 12 is an enlarged view similar to FIG. 2 which shows a fourth modification of an incident part in a code plate of the optical encoder of the present embodiment.

FIG. 12 is an enlarged view similar to FIG. 2 which shows a fourth modification of the incident part 13 in the code plate 1 of the optical encoder E of the present embodiment. As shown in FIG. 12, the incident part 13 of the present example has the form of a single annular projection which is formed on the first major surface 11. Further, the cross-section of this single annular projection in the plane containing the rotation axis RA includes a convex curved contour which sticks out from the first major surface 11. The incident part 13 with such a form can serve as a plano-convex lens which refracts light which has been emitted from the light emitter 2. As shown in FIG. 12, due to refraction at the incident part 13, the incident angle $\theta_1$ of the light with respect to the second major surface 12 is equal to or more than the inclination angle $\theta_0$ of the light with respect to the normal line to the first major surface 11 (that is, $\theta_1 > \theta_0$). Therefore, even if the above inclination angle $\theta_0$ is relatively small, it is possible to ensure that the incident angle $\theta_1$ with respect to the second major surface 12 is equal to or more than the critical angle $\theta_c$. In this way, in the present example, by suitably setting the convex curved contour which is included in the cross-section of the annular projection, even if the above inclination angle $\theta_0$ of the light is relatively small, it is possible to ensure that the light which is transmitted to the inside of the code plate 1 is totally reflected by the second major surface 12. Furthermore, according to the present example, the structure of the incident part 13 is simplified, and therefore it is possible to facilitate manufacture of the entire code plate 1.

Figure 13:
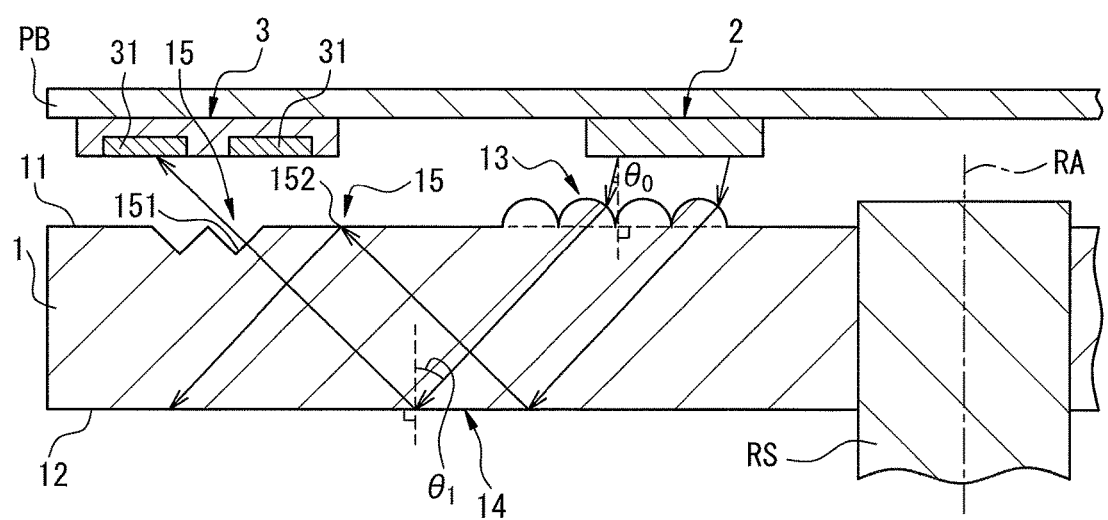
FIG. 13 is an enlarged view similar to FIG. 2 which shows a fifth modification of an incident part in a code plate of the optical encoder of the present embodiment.

FIG. 13 is an enlarged view similar to FIG. 2 which shows a fifth modification of the incident part 13 in the code plate 1 of the optical encoder E of the present embodiment. As shown in FIG. 13, the incident part 13 of the present example has the form of a plurality of annular projections which are arranged in the radial direction. Further, the cross-section of each of the annular projections in the plane containing the rotation axis RA includes a convex curved contour which sticks out from the first major surface 11. The incident part 13 with such a form can serve as a plano-convex lens which refracts light which has been emitted from the light emitter 2. As shown in FIG. 13, due to refraction of at the incident part 13, it is possible to ensure that the incident angle $\theta_1$ of the light with respect to the second major surface 12 is equal to or more than the inclination angle $\theta_0$ of the light with respect to the normal line to the first major surface 11 (that is, $\theta_1 > \theta_0$). Therefore, even if the above inclination angle $\theta_0$ is relatively small, it is possible to ensure that the incident angle $\theta_1$ with respect to the second major surface 12 is equal to or more than the critical angle $\theta_c$. In this way, in the present example, by suitably setting the convex curved contour which is included in the cross-section of the annular projection, even if the above inclination angle $\theta_0$ of the light is relatively small, it is possible to ensure that the light which is transmitted to the inside of the code plate 1 is totally reflected by the second major surface 12. Further, according to the present example, the structure of the incident part 13 is simplified, and therefore it is possible to facilitate manufacture of the entire code plate 1. Furthermore, according to the present example, the code pattern part 15 can be downsized in the axial direction, and therefore the entire optical encoder E is downsized in the axial direction.

In the above way, according to the optical encoder E of the present embodiment, the nonplanar incident part 13 on the first major surface 11 of the code plate 1 transmits the light which was emitted from the light emitter 2 to the inside of the code plate 1, and the planar primary reflection part 14 on the second major surface 12 of the code plate 1 totally reflects the light which is transmitted to the inside of the code plate 1 toward the code pattern part 15. Therefore, according to the optical encoder E of the present embodiment, even when the inclination angle $\theta_0$ of light with respect to the normal line to the first major surface 11 is relatively small, by suitably setting the orientation of the boundary surface of the incident part 13 with respect to the light emitter 2, it is possible to ensure that the incident angle $\theta_1$ of the light with respect to the second major surface 12 is equal to or more than the critical angle $\theta_c$. As a result, according to the optical encoder E of the present embodiment, even if the inclination angle $\theta_0$ of the light is relatively small, it is possible to ensure that the light which is transmitted to the inside of the code plate 1 is totally reflected by the second major surface 12 (see FIG. 4, FIG. 12, FIG. 13, etc.), and therefore it is possible to improve the degree of freedom of arrangement of the light emitter 2 with respect to the code plate 1.

EFFECT OF INVENTION

According to the first aspect of the present invention, the nonplanar incident part on the first major surface of the code plate transmits the light which is emitted from the light emitter to the inside of the code plate, and the planar primary reflection part on the second major surface of the code plate totally reflects the light which is transmitted to the inside of the code plate toward the code pattern part. Therefore, according to the first aspect, by suitably setting the orientation of the boundary surface of the incident part with respect to the light emitter, even if the inclination angle of the light to the normal line to the first major surface is relatively small, it is possible to ensure that the incident angle of the light with respect to the second major surface is equal to or more than a critical angle. As a result, according to the first aspect, it is possible to ensure that the light which is transmitted to the inside of the code plate is totally reflected by the second major surface even if the inclination angle of the light is relatively small, and therefore it is possible to improve the degree of freedom of arrangement of the light emitter with respect to the code plate.

According to the second aspect of the present invention, structure of the nonplanar incident part is simplified, and therefore it is possible to facilitate manufacture of the entire code plate.

According to the third aspect of the present invention, by suitably setting the vertex angle of the triangular cross-section of the annular projection, it is possible to ensure that the light which is transmitted to the inside of the code plate is totally reflected by the second major surface even if the inclination angle of the light is relatively small.

According to the fourth aspect of the present invention, by suitably setting the convex curved contour which is included in the cross-section of the annular projection, it is possible to ensure that the light which is transmitted to the inside of the code plate is totally reflected by the second major surface even if the inclination angle of the light is relatively small.

According to the fifth aspect of the present invention, structure of the nonplanar incident part is simplified, and therefore it is possible to facilitate manufacture of the entire code plate. Further, according to the fifth aspect, by suitably setting the vertex angle of the triangular cross-section of the annular groove, it is possible to ensure that the light which is transmitted to the inside of the code plate is totally reflected by the second major surface even if the inclination angle of the light is relatively small.

According to the sixth aspect of the present invention, even if the incident part and exit parts have complicated shapes, it is possible to manufacture the code plate easily and inexpensively by means of injection molding or other plastic forming technology.

The present invention is not limited to the above-mentioned embodiments and can be modified in various ways within the scope described in the claims. Therefore, even when the incident part 13 of the code plate 1 in the optical encoder E of the present invention have the form of a plurality of annular projections which are arranged in the radial direction, the cross-sectional shapes of these annular projections are not limited to only the cross-sectional shapes which are illustrated in FIG. 2 to FIG. 8 and FIG. 13 etc. For example, the incident part 13 of the code plate 1 in the optical encoder E of the present invention may also have a cross-sectional shape which is obtained by dividing a curved outer edge in a plano-convex lens into a plurality of regions and aligning these regions in the radial direction, that is, a Fresnel lens shape. Further, the dimensions, shapes, materials, etc. of the parts which were described in the above embodiments are only examples. Various dimensions, shapes, materials, etc. can be employed for achieving the effects of the present invention.

The invention claimed is:

1. An optical encoder comprising:
a rotary type code plate which has a first major surface, and a second major surface which faces the opposite side of said first major surface,
a light emitter which emits light toward said first major surface, and
a light receiver which receives the light reflected by said code plate, wherein
said first major surface is provided with a nonplanar incident part which extends in a ring shape around a rotation axis of said code plate and transmits the light emitted from said light emitter to the inside of said code plate,
said second major surface is provided with a planar primary reflection part which totally reflects the light which advances through the inside of said code plate,
said first major surface is further provided with a code pattern part which extends in a ring shape around a rotation axis of said code plate at a different position from said incident part, and which switches transmission/non-transmission of the totally reflected light by said primary reflection part in accordance with a rotation position of said code plate, and
said code pattern part has nonplanar exit parts which transmit the totally reflected light by said primary reflection part toward said light receiver, and planar secondary reflection parts which again totally reflect the totally reflected light by said primary reflection part, wherein the exit parts include a boundary surface angled relative to an incident angle of the light to be totally reflected with respect to the second major surface such that the totally reflected light by the primary reflection part reaches the boundary surface of the exit parts at an incident angle of substantially zero and the exit parts transmit the totally reflected light to the light receiver without being substantially refracted, said secondary reflection parts and said exit parts being arranged alternately in a circumferential direction around the rotation axis of said code plate.

2. The optical encoder according to claim 1, wherein said incident part has the form of one or more annular projections which are formed on said first major surface.

3. The optical encoder according to claim 2, wherein said annular projection has a triangular cross-section in a plane containing said rotation axis.

4. The optical encoder according to claim 2, wherein a cross-section of said annular projection in a plane containing said rotation axis includes a convex curved contour which sticks out from said first major surface.

5. The optical encoder according to claim 1, wherein said incident part has the form of one or more annular grooves which are formed on said first major surface, and said annular groove has a triangular cross-section in a plane containing said rotation axis.

6. The optical encoder according to claim 1, wherein said code plate is formed from a plastic material.

* * * * *